(12) United States Patent
Tsang

(10) Patent No.: US 11,270,461 B2
(45) Date of Patent: Mar. 8, 2022

(54) SYSTEM AND METHOD FOR POSTURE SEQUENCE ON VIDEO FROM MOBILE TERMINALS

(71) Applicant: Genieland Company Limited, Hong Kong (HK)

(72) Inventor: Chun Yin Tsang, Hong Kong (HK)

(73) Assignee: Genieland Company Limited, Hong Kong (HK)

( * ) Notice: Subject to any disclaimer, the term of this patent is extended or adjusted under 35 U.S.C. 154(b) by 89 days.

(21) Appl. No.: 16/735,720

(22) Filed: Jan. 7, 2020

(65) Prior Publication Data

US 2020/0219284 A1 Jul. 9, 2020

Related U.S. Application Data

(60) Provisional application No. 62/789,453, filed on Jan. 7, 2019.

(51) Int. Cl.
*G06K 9/00* (2006.01)
*G06T 7/73* (2017.01)
*G06T 7/246* (2017.01)

(52) U.S. Cl.
CPC .............. *G06T 7/75* (2017.01); *G06T 7/251* (2017.01); *G06T 7/74* (2017.01); *G06T 2207/10016* (2013.01); *G06T 2207/30196* (2013.01); *G06T 2207/30244* (2013.01)

(58) Field of Classification Search
CPC ............. G06T 7/75; G06T 7/251; G06T 7/74; G06T 2207/30196; G06T 2207/30244; G06T 2207/10016; G06T 2207/20084; G06K 9/00362; G06N 3/045
See application file for complete search history.

(56) References Cited

U.S. PATENT DOCUMENTS

| | | | | |
|---|---|---|---|---|
| 2012/0092445 | A1* | 4/2012 | McDowell | H04N 7/147 348/14.16 |
| 2012/0320158 | A1* | 12/2012 | Junuzovic | G06Q 10/101 348/46 |
| 2015/0149956 | A1* | 5/2015 | Kempinski | G06F 3/013 715/784 |
| 2017/0228587 | A1* | 8/2017 | Zhang | G06K 9/469 |
| 2018/0025249 | A1* | 1/2018 | Liu | G06N 3/04 382/158 |

(Continued)

*Primary Examiner* — Amara Abdi

(57) ABSTRACT

Embodiments of the present invention provide a system and a method for posture estimation, comprising: capturing a video sequence by a mobile terminal, the video sequence including a plurality of frames; extracting a plurality of convolutional features of a subject in the video sequence; estimating pose of a subject from the video sequence; constructing a model of the plurality of features from the estimated pose; estimating the posture of the subject from the plurality of features. The system also determines a key posture sequence from unconstrained video, where a mobile terminal captures a video sequence; a tracker estimates a reference subject; a posture estimator estimates a posture of the subject from plurality of features; a posture analytic unit assesses the estimated posture; a posture reconstructing unit reconstructs the posture into three dimensional space; an evaluating unit determines the estimated posture that should be added to key posture sequence.

20 Claims, 5 Drawing Sheets

(56) References Cited

U.S. PATENT DOCUMENTS

| | | | |
|---|---|---|---|
| 2018/0049669 A1* | 2/2018 | Vu | A61B 5/0816 |
| 2019/0347826 A1* | 11/2019 | Zhang | G06K 9/4604 |
| 2019/0362139 A1* | 11/2019 | Mehl | A61B 5/1116 |
| 2020/0162641 A1* | 5/2020 | Thota | G06K 9/00711 |

* cited by examiner

410

420

430

SYSTEM AND METHOD FOR POSTURE SEQUENCE ON VIDEO FROM MOBILE TERMINALS

CROSS-REFERENCE TO RELATED APPLICATIONS

This application claims the benefit of U.S. Provisional Patent Application No. 62/789,453 filed on Jan. 7, 2019, the entire content of which is hereby incorporated by reference.

FIELD OF THE INVENTION

The present invention relates to machine vision and in particular to machine-based pose estimation and posture recognition of subjects, to produce a sequence of key posture from video obtained from mobile terminals.

BACKGROUND OF THE INVENTION

In the latest decade, there are numerous breakthrough no matter on the algorithm or computational power, creating a great environment for Artificial Intelligence (AI) development. Computer vision, one of the most crucial sub-domain of AI, was deeply impacted by this wave. With the power of Deep Learning, state-of-the-art computer vision algorithms can perform detection and classification task almost equivalent or soon can surpass human.

In order to allow the computer to perform tasks same as human do or even further analyze the situation, it requires the AI to understand our physical world. Computer Vision is crucial for AI, because it has the majority contribution on helping the AI to connect with our world by providing visual information. Vision is the most important sense for human, which people cannot bare to lose out of all the other senses.

There are multiple approaches for a computer to analyse and track a subject's posture based on visual images, mental image or video sequences. Some approaches are bottom-up approaches where components of subject are detected; others are top-down where the whole subject is detected instead. To detect different level of subject's features, a detection system might require numerous concatenated algorithms Yet, some approaches tend to use end-to-end algorithms There is no solid answer on which methodology is the best way to do it. It just matters to a system on how much data requires to train it and how fast can it run in detection phase.

When it comes to detection speed, algorithm complexity and computational power are the two factors that should be taken into account. In common, most of these calculation tasks were being performed with a set of processing unit (e.g. cloud servers). However, some of the recent developments demonstrated that possibility of running such complex task on mobile terminals, which opens up the capability of a system to include end point process and cloud process at the same time.

In general, previous approaches often relied on assumed models of shape, to track motion from intensity or depth data. Due to the complexity of real-world scenario and innate limitation of data, the problem formulations of most posture estimation methods are very complex (usually NP-hard). To solve the problem of innate limitation, some development relies on multiple video cameras or complex motion sensing input devices, which are prohibitively expensive. In addition, some of them have to be set up in a confined environment such as a capturing studio, which severely limits the application of the system.

Accordingly, what is needed in the art is a more efficient and mobile solution for estimating human posture. An approximate solution has been proposed to utilize various forms of data, extracting information to perform optimal posture estimation, whilst not sacrificing the mobility due to large amount of complex calculation required to complete such task.

SUMMARY OF THE INVENTION

The present invention provides a method to estimate a sequence of key posture from a video obtained from mobile terminals. This is in contrast with the prior art methods on three main aspect which are: (i) relying on depth sensors combined with monochrome sensor (ii) all data processing must be performed on remote computing device (iii) all pose and posture are indifferently recorded into sequence. The method of the present invention eliminates the need for specialized equipment such as depth sensor and confined environment setup. Hence, reduces the overall cost of the system, which allows non-industrial user to invest in the equipment. At the meantime, the present invention performs multistage data processing selectively on remote computing device and mobile terminal, which enhance the mobility of the system. Additionally, the present invention is designed to record key posture and pose information from ubiquitous video into the sequence, instead of indifferent recording.

According to one aspect of the present invention, a new system for determining key posture into the sequence is provided. The system includes at least one computing device comprising hardware components and software programs for receiving an unconstrained video comprising a plurality of consecutive frames, generating a plurality of best posture hypotheses for each of the plurality of consecutive frames. The system further includes managing the generation process optimally on mobile terminal and remote computing device. Furthermore, the system comprises one or more non-transitory computer-readable media having computer-executable instruction for performing a method of running a software program on a computing device. Hence, various processes could be selected to perform on mobile terminal, enabling further off-line function for future application.

According to another aspect of the present invention, a new system and method for tracking the key posture of a subject without any visual markers is provided. The system includes the steps of capturing or providing a video sequence from mobile terminal, the video sequence including a plurality of frames; extracting a plurality features of a subject in the video sequence; estimating a first pose of the subject; tracking the subject with features and first pose; constructing a model of the plurality of features; estimating the posture from the model; evaluating correspondences of the plurality of features over the plurality of frames of the video sequence to determine a key posture.

In an embodiment of the present invention, a key posture comprises plurality of features such as body part nodes. The body part nodes are selected from nose, neck, right shoulder, right elbow, right wrist, left shoulder, left elbow, left wrist, right hip, right knee, right ankle, left hip, left knee, left ankle, and groin. In addition, the abstract body model includes right elbow, right armpit, right neck, left neck, left armpit, left elbow, right crotch, right waist, left waist, left crotch, right knee, and left knee.

In a further aspect of the invention, the system determines key posture, by an accumulating feature vector for posture from past frame of video. Plurality of features provided from previous stage will be taken into account and additional feature will be generated for the evaluation as well, resulting in a sequence of posture that is not recorded indifferently with respect to each frame.

An aspect of the present invention provides a system for estimating pose and posture information of a subject, the system comprising: a mobile capturing device for continuously capturing image and/or video data of the subject situated or moving freely within a virtual space; one or more processing units for obtaining the image and/or video data from the mobile capturing device and executing one or more machine learning algorithms for automated processing of the image and/or video data to: extract and learn basic convolutional features of the subject to identify specific features of the subject based on learned basic convolutional features; estimate a pose of the subject based on the specific features of the subject, where estimating the pose of the subject includes estimating body part information from a given image of the subject, and where the pose includes body part type, x-axis and y-axis coordinates with respect to location on the given image; generate an abstract human body model of the specific features of the subject based on the estimated pose; and estimate a posture of the subject from the specific features included in the abstract human body model; wherein generating the abstract human body model of the subject includes: coupling each body part with a predefined abstract body part; augmenting a plurality of missing single and coupled body parts of the subject based on the coupled body parts; and constructing a skeletal representation of the subject, representing an estimated posture of the subject, by connecting the augmented missing parts with the coupled body parts; and wherein, the captured video data is unconstrained video data and the video data includes a plurality of frames; and wherein the abstract human body model comprises information of each body part, along with spatial constraints between body parts in each frame and temporal consistency throughout the plurality of frames.

Another aspect of the present invention provides a method for estimating pose and posture information of a subject, the method comprising: continuously capturing image and/or video data of the subject situated in a virtual space covering the subject, using a mobile capturing device; implementing one or more machine learning algorithms on the image and/or video data, by one or more processing units, and executing automated processing of the image and/or video data to: extract and learn basic convolutional features of the subject to identify specific features of the subject based on learned basic convolutional features; estimate a pose of the subject based on the specific features of the subject, where estimating the pose of the subject includes estimating body part information from a given image of the subject, and where the pose includes pose information including body part type, x-axis and y-axis coordinates with respect to location on the given image; generate an abstract human body model of the specific features of the subject based on the estimated pose; and estimate a posture of the subject from the specific features included in the abstract human body model; wherein generating the abstract human body model of the subject further includes: coupling each body part with a predefined abstract body part; augmenting a plurality of missing single and coupled body parts of the subject based on the coupled body parts; and constructing a skeletal representation of the subject, representing an estimated posture of the subject, by connecting augmented missing parts with the coupled body parts; and wherein, the captured video data includes a plurality of frames; and wherein the abstract human body model comprises information of each body part, along with spatial constraints between body parts in each frame and temporal consistency throughout the plurality of frames.

BRIEF DESCRIPTION OF THE DRAWINGS

In order to describe the present invention, for fully understanding and more apparent in the light of the following detailed description when taken in conjunction with the accompanying drawings, in which.

DETAILED DESCRIPTION OF THE PREFERRED EMBODIMENTS

This patent describes the subject matter for patenting with specificity to meet statutory requirements. However, the description itself is not intended to limit the scope of this patent. The principles described herein may be embodied in many different forms.

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout 1. System Definition and Overview Preferred embodiments of the present invention will be described herein-below with reference to the accompanying drawings. In the following description, well-known or constructions are not described in details to avoid obscuring the invention in unnecessary detail.

The present invention provides a method and system to estimate key posture sequence of a subject in an unconstrained video. Generally, a posture estimating system includes a capturing device to collect plurality of video/ image frames. For example, the capturing device may include a depth senor. The posture estimating system further includes a tracking and estimating system for locating subject in the real-world, and a processor, e.g., a computing device, for handling all the calculation and data processing of the system.

1.1 Application Scenario

Figure 1:
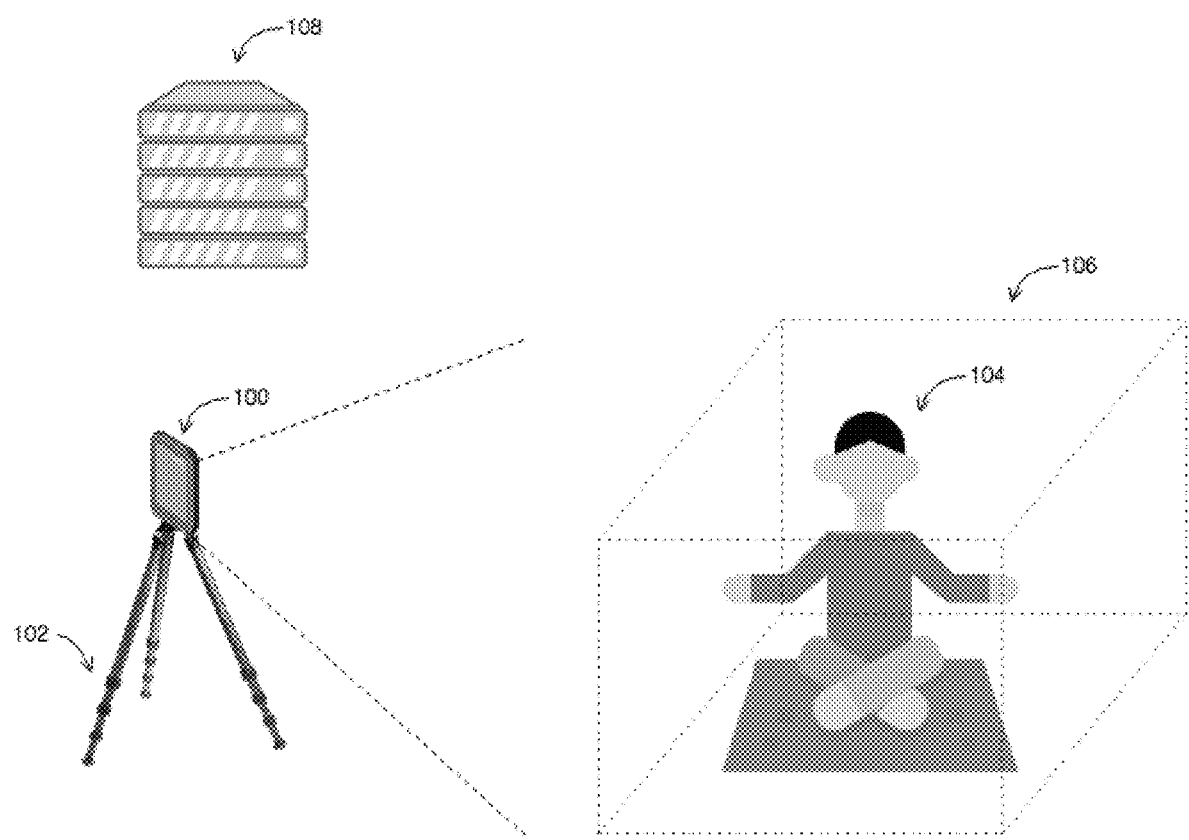
FIG. 1 is a schematic diagram illustrating a key posture estimating system supported with mobile terminal, in accordance with an embodiment of the present invention.

Referring to FIG. 1, an exemplary scenario of a mobile terminal to be used in conjunction with the present invention is illustrated. The mobile terminal 100 could be any computing device that can capture video; the video sequence comprises a plurality of frames. However, the image types of the frames are not constrained; it could be any form of visual image combining with a RGB-image or just a single RGB-image as baseline. Hence, each frame may comprise multiple images with relatively equivalent dimension, for instance, depth image with RGB-image.

The estimating system requires the mobile terminal 100 to maintain an appropriate angle and height to create a virtual work-space 106. A supporting object 102, e.g., tripod or any other object that could leverage the view angle of the mobile terminal 100 may be included in the system. The virtual work-space 106 should be able to cover every body part of the subject 104 for accurate tracking and posture estimation. The size of the virtual work-space is not constrained to specific dimension, but the virtual space should be relatively with equal ratio of X×Y×Z pixel, with respect to the real-world space. The subject 104 is not required to carry additional device or visual markers for detecting any body parts. Meanwhile, the subject 104 can perform unconstrained posture within the virtual work-space. Video obtained from the mobile terminal 100 undergoes multistage processing. The mobile terminal 100 may include one or more processing units for processing a video captured by the mobile terminal 100. Further, the system also includes a computing device 108, which communicates with the mobile terminal 100. The mobile terminal 100 may communicate over a wireless or wired communication link with the computing device 108. Wireless communication links may include and is not limited to Bluetooth, infrared, Internet, WLAN, WAN, IEEE 802.11 and the like. Wired communication links may include and is not limited to LAN, cable connections, Ethernet, and the like In an embodiment, a part of the processing of the video obtained from the mobile terminal 100 is processed within the mobile terminal 100 using the one or more processing units included in the mobile terminal 100 while a part of the processing of the video is send to the computing device 108 for processing. Since the subject 104 stays within the virtual work-space 106, the processing units can determine a sequence of posture and pose information from each frame, then estimate key posture sequence after a section is concluded. The computing device 108 could be either located within the same physical venue as the mobile terminal 100 or remotely, which is physically far away from the location.

1.2 Training Posture Estimator

For a vision-based estimating system, a model is needed, which is matched against image and pose information of the subject obtained from the captured video, for estimating the posture of the taken subject. In the method of the present invention, a multistage automated process is trained to learn the composite model for estimating a subject's posture from given image. The present invention uses real scene feature for estimating the posture and pose information of a subject.

Figure 2:
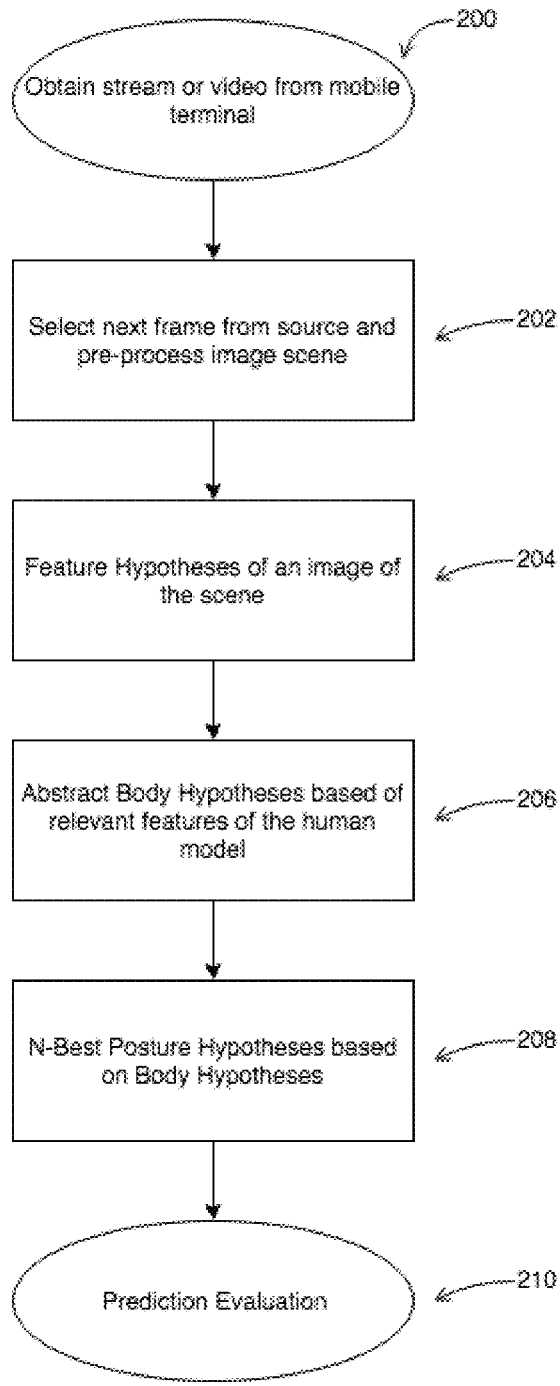
FIG. 2 is a flowchart illustrating the method for estimating a posture from unconstrained video, in accordance with an embodiment of the present invention.

FIG. 2 is a flowchart illustrating the composite model to estimate a posture from unconstrained video. The multistage process includes four major step or sub-process: (i) image acquirement and pre-processing 202; (ii) feature extraction and hypotheses 204; (iii) abstract body hypotheses and modelling 206; (iv) posture hypotheses 208. While the posture estimation system together with the mobile terminal 100 is in use, the system captures a video sequence (step 200) of the subject located/moving in the virtual work-space 106, the video sequence including a plurality of frames, each frame is then down-sampled or augmented as a pre-processing (step 202) before being fed to the feature extraction module 204. The pre-processing can significantly increase the variation of the image and reduce the computation complexity, hence, improve the accuracy and speed of the extraction with constrained trade-off.

The feature extraction process 204, uses machine learning algorithms, e.g., deep convolutional neural networks, to extract conventional features. These may include basic features such as points, lines and circles of objects in the scene, planar patches or composite features such as polygons or colors. Yet, it may be understood by a person ordinary skilled in the art that all these features are just abstract features defined based on common sense of human, not all features learned by the algorithm are necessarily explainable based on human logic. In most of the cases, such algorithm learns from given data without constraints, just like a black box. Depending on the configuration of the mobile terminal, the feature extraction step 204 can be done in the mobile terminal 100 or the remote computing device 108. In addition, the learned basic features are not outputted from the module instead specific features are determined based on these basic features learned by the machine learning algorithms.

The specific features are selected body parts according to an embodiment, and these body parts form a set of feature correspondences and abstract coupled body parts as well. All these augmented features are used in abstract body hypotheses process at step 206. The processes of specific feature extraction at step 204 and abstract body hypotheses, at step 206, based on the specific features extracted basically generate an estimated human model, where the model comprises information of each body part, along with spatial constraints between the body parts in each frame and temporal consistency throughout the frames.

At this point, the specific features are tracked along the abstract human body model, simultaneously and accordingly of the movements of the subject 104 within virtual work-space 106. This tracking information further undergoes the posture hypotheses module at step 208 eventually. The posture hypotheses employ particular feature, for instance, 2D skeletal pose representation or 2D-3D matching and bundle adjustment metric to evaluate the best represented model by the given abstract body model. A certain number of N posture hypotheses may be proposed and the best posture with respect to previous feature correspondences is finally determined as a single resulting posture. The resulting posture will be used for evaluation of error analysis, at step 210, to determine the performance of the algorithm. For example, for determining the performance of the algorithms applied in the method, the evaluated posture is compared with the actions performed in ground truth posture. Indeed, all predicted features will undergo the evaluation process for error analysis so as to improve the estimation model in every single aspect.

2. Implementation

The present invention provides a methodology to generate a sequence of key posture from an unconstrained video. The method emphasises on collecting essential information instead of indifferent recording of all pose information of the subject.

Figure 3A:
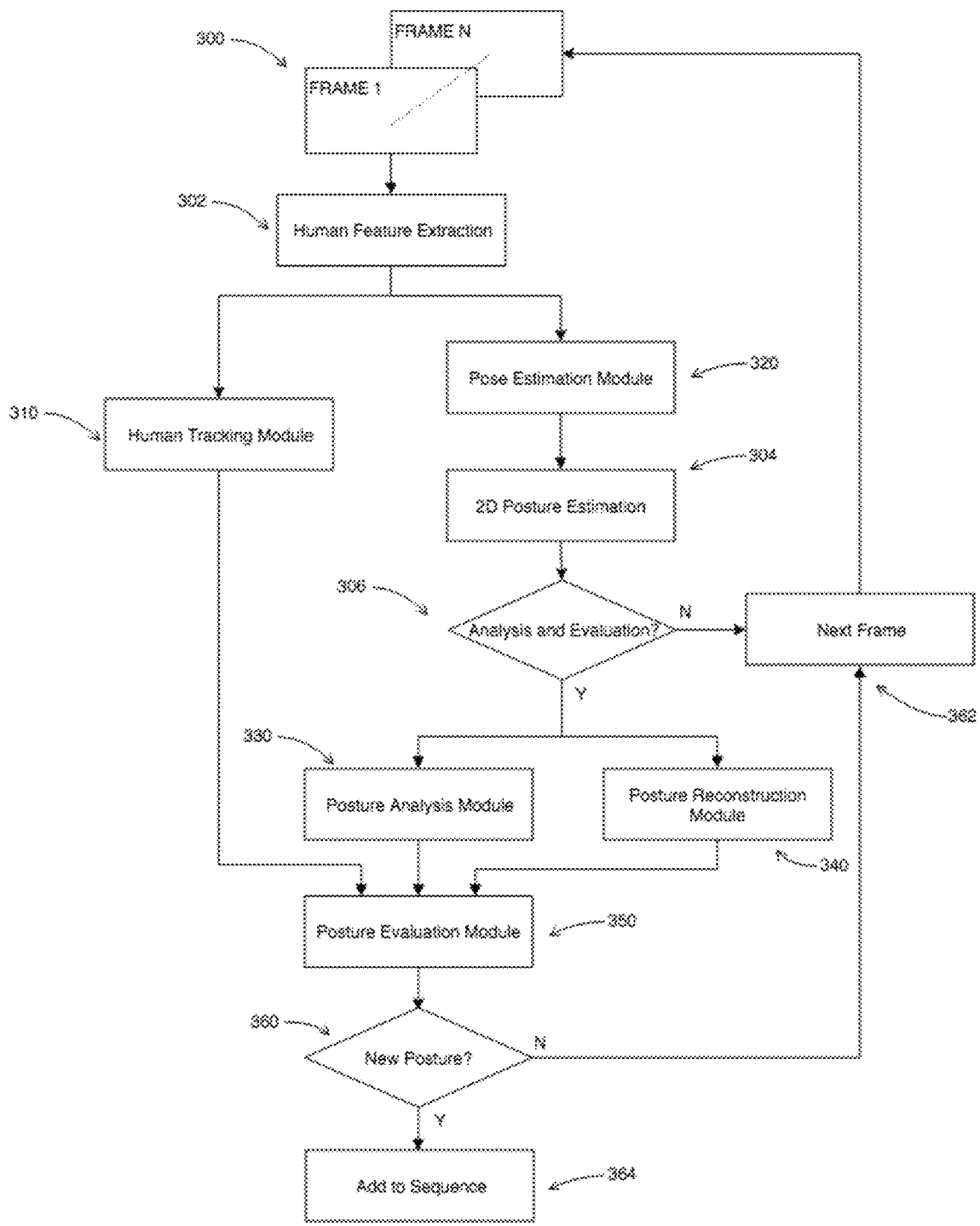
FIG. 3A is a flowchart illustrating the abstract tracking phase of the method for determining key posture from unconstrained video, in accordance with an embodiment of the present invention.

An exemplary system for implementing the method of the present invention is shown in FIG. 3A. The system includes (i) a human feature extractor 302, (ii) a human tracking module 310, (iii) a pose estimation module 320, (iv) a 2D posture estimator 304, (v) posture analysis module 330, (vi) posture reconstruction module 340, (vii) a posture evaluation module 350. Additionally, the system also includes a mobile terminal for capturing, and a storage system to record the captured video 300 and processing result 364.

2.1 Details of System Component

Figure 3B:
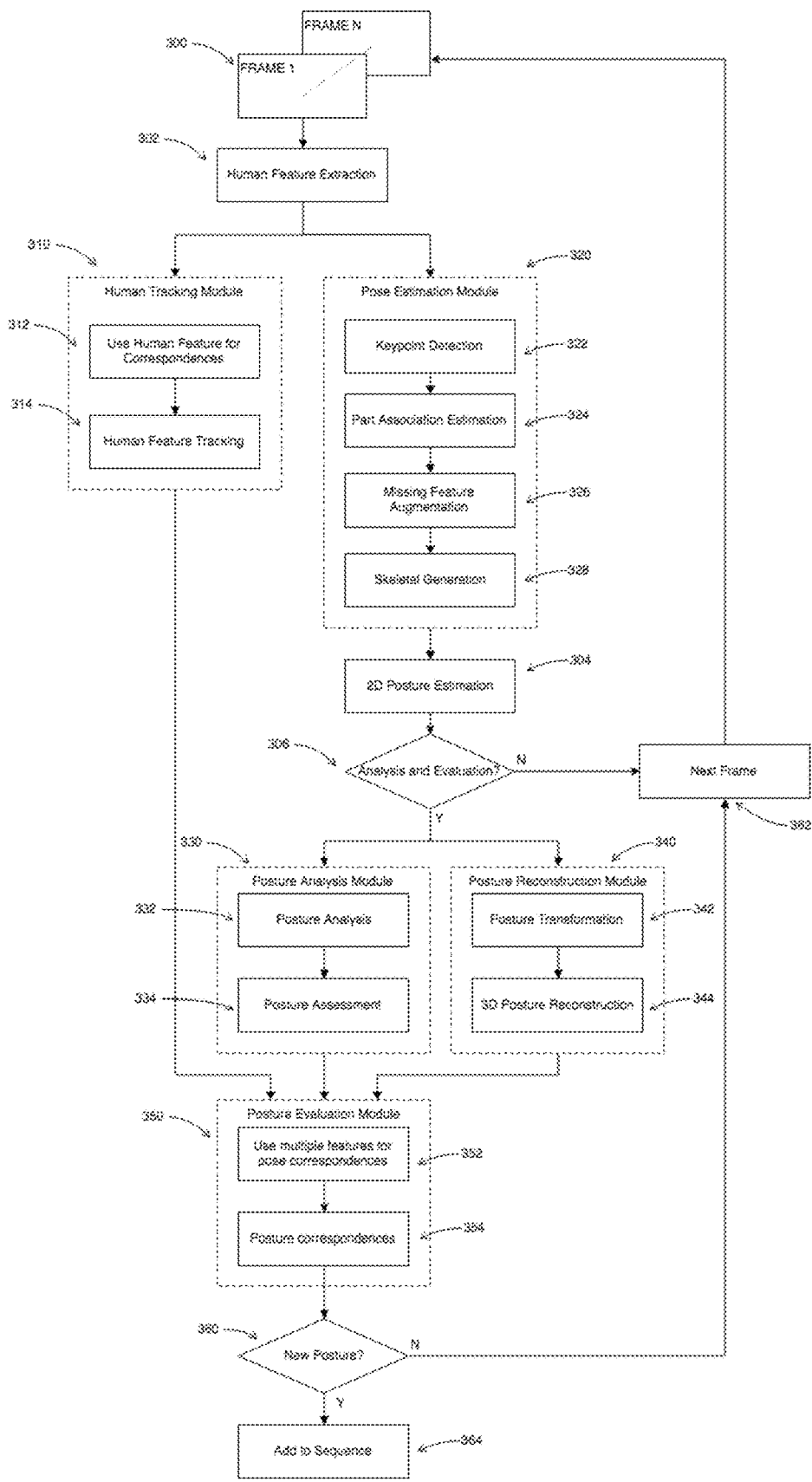
FIG. 3B is a flowchart illustrating the detail tracking phase of the method for determining key posture in accordance with the present invention where a set of features are used.

Once a posture estimation model is available, the key sequence estimation system can be constructed. FIG. 3B describes the detail component involved in every module. Note that, not all modules necessary to be real time, i.e., a posture reconstruction module can reconstruct the subject with its posture in 3D space with less than 1 fps (frames per second) speed. Due to the face that it does not have majority contribution on the posture evaluation process during runtime.

Now, each of the components of the system will be described below accompany with FIG. 3B.

Human Tracking Module (310): Although the system is vision-based, vision is used as the baseline of the tracking unit. With composite image, the tracking module adapts to multiple conventional tracking method such as magnetic, ultra-sound, inertial, thermal. Some of these conventional features are provided from the human feature extractor 302, whilst some are generated within the module. Using these features, the correspondences between the selected frame and the subject are established 312. The set of feature correspondences will be tracked over a number of frames, this help to identify the tracked subject throughout the video until the N th frame or the subject leaves the virtual work-space 106. The tracker may also use various algorithms such as hidden markov model or kalman filtering to assist the visual tracking.

Pose Estimation Module (320): An estimated pose is different from posture, the combination of position and orientation is referred to as the pose of an object, even though this concept is sometimes used only to describe the orientation. For human pose estimation, the main purpose is to estimate the body part information from a given image, it does not recognize the identity or any other information related to the subject. Although different poses can be coupled to become abstract body part or even further into skeletal representation, these composite pose does not have any meaning to human logic. In contrast, a posture has a specific meaning under human definition, a similar posture could have multiple meanings across different domain or industry, a posture is more than just a skeletal representation of a human pose.

A key point detector (322) is used estimate the pose information of the body part from every given frame, the pose information must comprise a body part type, x-axis and y-axis coordinates with respect to the location on the given image. It is possible to include supplement information such as z-axis coordinate based on the given scenario and application. Each body part will be coupled based on a predefined abstract body model, and the part association is estimated (324). In an embodiment, each coupled part represents two or more body part, since estimator should always predict a fixed number of N body part and M associate part. An augmentation unit 326 is followed after the association were estimated, to predict the pose of the missing part. The augmentation considers two important factors, the previous location of that particular body part, and if any and a set or preset degree of freedom (DOF), which refers to the freedom of movement of a rigid body in three-dimensional space. After the missing part is augmented, all the pose information will be connected and generates a skeletal representation (328).

2D Posture Estimator 304: Given the estimated skeletal representation of the subject's pose, the pose information is compiled by a posture estimator. Except the pose information and skeleton, additional feature may be given to the estimator, since different posture has various meaning with respect to the scenario. For instance, a lifted hand posture could mean a shooting posture in a basketball court, whilst it could also mean seeking for assistant in other scenario. The estimator will base on the complementary feature, to finalize its prediction from N proposed postures.

For some application scenario, it requires real time posture estimation but not the followed analysis and evaluation. For such case, the system will decide to ignore the remaining process 306 and proceed to next frame 362. In some other scenario regarding the environment configuration, i.e., the computation power of the mobile terminal can support minimal processing, the above process will be performed within the mobile terminal, whilst the rest will be process in a remote computing device. Therefore, the remote computing device in connection with the mobile capturing device includes one or more processors, and wherein the automated processing of the video is partly executed in the processors included in the mobile capturing device and partly executed in the one or more processors included in the remote computing device.

Posture Analysis Module 330: The predicted posture from 304 is a candidate posture to be register into key posture sequence. The analysis module 332 further analyses the skeletal posture by generating more complex analytic feature, i.e., joint angles for metric comparison. These comparisons indicate the stage of that particular posture, for instance, the subject is in initial position, or the subject is entering an ending position. Some of these assessments (334) may be provided by the domain expertise, which include acceptable DOF range of a posture etc.

Posture Reconstruction Module 340: The predicted skeleton posture(s) are defined in a two dimension space, to allow user to visualize the posture in a more appropriate manner. The posture is then transformed (342) into three dimension space using machine learning algorithms. The 3D posture might not be consistent due to the minor prediction error for each frame, which might result in a flickering movement of the virtual subject with three-dimensional space. A generative algorithm (344) is used to reconstruct the 3D posture referencing previous frames.

Posture Evaluation Module 350: The evaluation module contributes on determining whether the predicted posture is a new key posture. If it is a new key posture (360) all the previous pose information, analytic features and reconstructed posture will be registered into the sequence 364. The evaluation will first calculate the correspondences of pose feature and analytic feature 352, i.e., temporal consistency of appearances and locations between adjacent frames. Then, followed by calculating the posture correspondences which are referencing all accumulated frame after the previous key posture 354.

2.2 Body Part and Abstract Body Model

Figure 4:
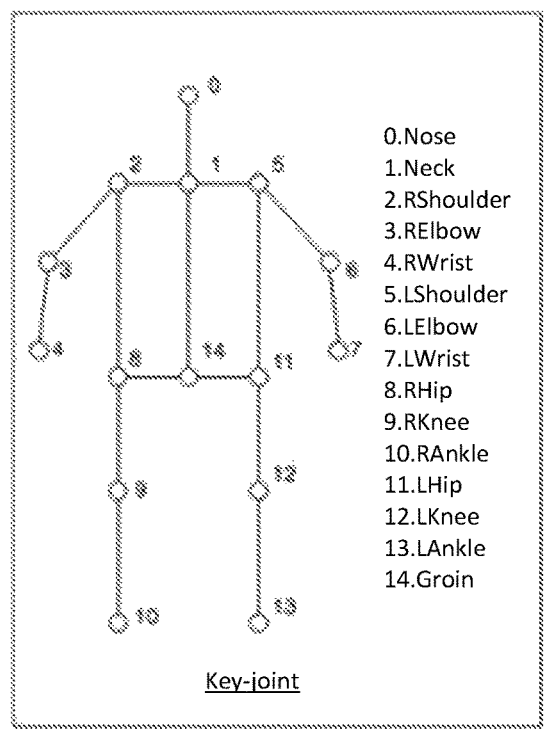
FIG. 4 is an illustration of what body parts are combined into abstract body part, and comprising other feature for key posture evaluation, in accordance with an embodiment of the present invention.
Figure 4:
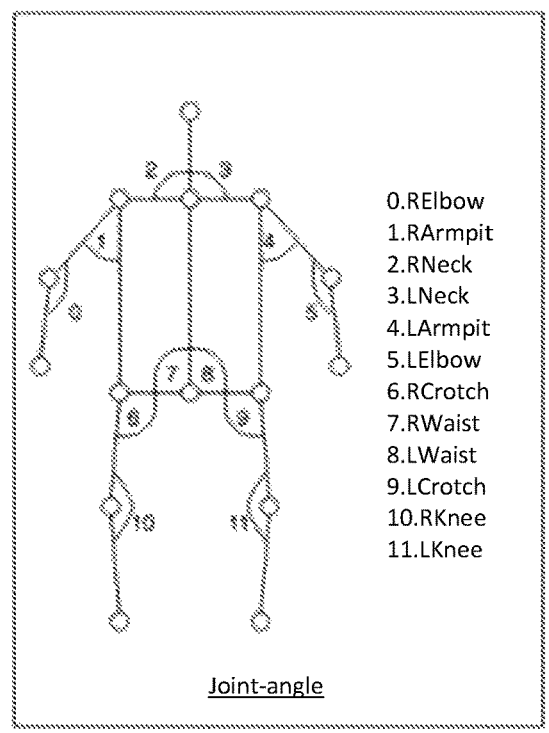
Figure 4:
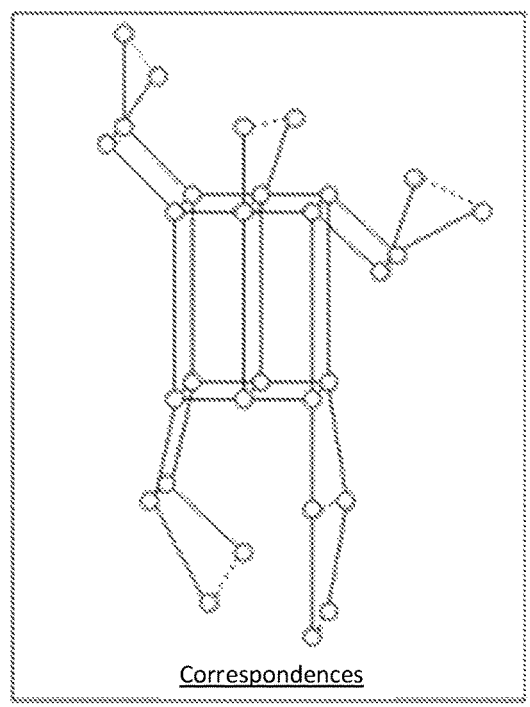

The body part and abstract body model mentioned in previous steps, are illustrated in FIG. 4. The key point, and body parts selected from a human body are shown and labelled from 0 to 13 indicated as circle in 410, which includes nose, neck, right shoulder, right elbow, right wrist, left shoulder, left elbow, left wrist, right hip, right knee, right ankle, left hip, left knee, left ankle, groin. Coupled body part will also be employed for the estimation, wherein the each of the abstract coupled body part represents two body parts. The coupled body parts are used for pose estimation, and the associated part is indicated as line in 410. In addition, multiple associated parts could be coupled as to calculate joint-angle in 420, which includes right elbow, right armpit, right neck, left neck, left armpit, left elbow, right crotch, right waist, left waist, left crotch, right knee, left knee.

Lastly, step 430 illustrates the correspondences of the skeletal comparison, i.e. temporal consistency of appearances and locations difference.

In summary, the present invention provides a method for posture estimation, comprising: capturing a video sequence by a mobile terminal, the video sequence including a plurality of frames; extracting a plurality of convolutional features of a subject in the video sequence; estimating pose of a subject from the video sequence; constructing a model of the plurality of features from the estimated pose; estimating the posture of the subject from the plurality of features.

The extracting of the plurality of convolutional features step is performed in real time.

The extracting of the plurality of convolutional features step is performed on both recorded video sequence and live video sequence.

The video captured is unconstrained. The video could be combined with, i.e., depth image, thermal image, as long as using a RGB-image as baseline. The capturing device is a mobile terminal with at least a camera, for example a digital camera.

The constructing a model step further comprises the steps of: estimating the plurality of body parts of a subject from the video sequence; combining the plurality of coupled body parts of a subject to abstract body part; augmenting the plurality of missing single and coupled body parts of a subject; constructing a skeletal representation of the subject from the estimated pose.

In an embodiment, the body parts are selected from nose, neck, right shoulder, right elbow, right wrist, left shoulder, left elbow, left wrist, right hip, right knee, right ankle, left hip, left knee, left ankle, groin, as may be apparent to a person ordinary skilled in the art, that the body parts may be selected from the group aforementioned, or also may include other body parts, without deviating from the meaning and scope of the present invention.

The abstract body parts further comprise coupled abstract body part for calculation i.e., joint-angle.

The estimated posture of the subject from the plurality of features, further comprising generating a plurality of best posture hypotheses using N-best inference algorithm.

The present invention also provides a system for determining a set of key posture sequence from unconstrained video, comprising: a mobile terminal to capture or provide a video sequence; a tracker for estimating a reference subject; a posture estimator for estimating a posture of the subject from plurality of features; a posture analytic unit for assessing the estimated posture; a posture reconstructing unit for reconstructing the posture into three dimensional space; an evaluating unit for determining the estimated posture that should be added to key posture sequence. The posture estimator estimates the plurality of posture hypotheses in real time. The posture estimator estimates the plurality of posture from both recorded video sequence and live video sequence.

The system further comprises a computing device for processing, if the mobile terminal is not capable to process all step in real time.

The posture analytic unit comprises: analysing pose information provided by posture estimator; generating complex analytic feature, i.e., joint-angles; assessing the plurality of posture based on the plurality of rubrics provided by domain experts.

Further, the posture reconstructing unit comprises: posture transformation from two dimensions into three dimension space using machine learning algorithms; posture reconstruction evaluating over the plurality of frames of the video sequence to determine whether the plurality of estimated posture are stable.

The evaluating unit evaluates all features estimated from the current frame combined with correspondences from the plurality of N-previous frame.

The system further comprises a program storage device readable by machine, wherein storing the captured video, pose information and key sequence.

Pose information further comprises: tracking correspondences from tracker; estimated posture and body part pose information from posture estimator; generated complex analytic feature and analytic result from analytic unit; reconstructed posture from reconstructing unit.

The invention has been described in complete and diagrammatically shown in the accompanying drawings. It is not to be limited to such details, as many changes and modifications may be added in the presented invention without departing from the spirit and scope of the invention. Hence, it is described to cover any and all modifications and forms which may come within the language and scope of the appended claims.

While certain embodiments have been described, these embodiments have been presented by way of example only, and are not intended to limit the scope of the present disclosure. Indeed, the novel methods, devices, and systems described herein may be embodied in a variety of other forms. Furthermore, various omissions, substitutions, and changes in the form of the methods, devices, and systems described herein may be made without departing from the spirit of the present disclosure.

The invention claimed is:

1. A system for estimating pose and posture information of a subject in real time, the system comprising:
 a mobile capturing device for continuously capturing, in real time, image and/or video data of the subject situated or moving freely within a virtual space;
 one or more processing units for obtaining, in real time, the image and/or video data from the mobile capturing device and executing one or more machine learning algorithms for automated processing of the image and/or video data, in real time, to:
  extract and learn basic convolutional features of the subject to identify specific features of the subject based on learned basic convolutional features, where the specific features of the subject are body parts of the subject;
  estimate a pose of the subject based on the specific features of the subject, where estimating the pose of the subject includes:
   estimating pose information of each body part related to the specific feature of the subject, from a given frame in an image of the subject, and where the pose information includes a body part type, x-axis and y-axis coordinates of the body part type with respect to location of the subject on the given frame in the image;
  generate an abstract human body model of the specific features of the subject based on the estimated pose, wherein the abstract human body model includes the pose information of each body part, alone with spatial constraints between the body parts in each frame in the video and temporal consistency between the body parts throughout a plurality of frames in the video;
  tracking the pose information of each body part related to the specific feature of the subject alone the abstract human body model simultaneously and accordingly of the movements of the subject within the virtual space throughout the plurality of frames in the video to estimate a meaningful posture of the subject; and estimate a posture of the subject from the specific features included in the abstract human body model;

wherein generating the abstract human body model of the subject includes:

coupling each body part with other body part based on a predefined abstract body model;

augmenting a plurality of missing body parts of the subject based on the coupled body parts; and constructing a skeletal representation of the subject by connecting pose information of all the body parts including the coupled body parts and the missing body parts; and wherein the estimated posture of the subject is constructed based on the skeletal representation, the pose information of all the body parts in the skeletal representation and a real-time scenario of the subject which provides meaning to the posture; and wherein, the captured video data is unconstrained video data and the video data includes a plurality of frames.

2. The system of claim 1, wherein extracting of the basic convolutional features is performed in real time, and wherein extracting of the basic convolutional features is performed on a recorded video sequence and/or a live video sequence, and wherein the one or more processing units implements the one or more machine learning algorithms including deep convolutional neural networks, to extract the basic convolutional features.

3. The system of claim 2, wherein the video data captured is unconstrained, where the video data is an RGB-image as baseline and is combined with one or more image tracking dimensions including depth image or thermal image or magnetic image, or ultra-sound image, inertial image.

4. The system of claim 1, wherein the mobile capturing device is a mobile terminal with at least a digital camera and the one or more processing units are included in the mobile capturing device executing the one or more machine learning algorithms for the automated processing of the image and/or video data.

5. The system of claim 4 further comprising a remote computing device in connection with the mobile capturing device and wherein the remote computing device includes one or more processing units, and wherein the automated processing of the image and/or video data is partly executed in the one or more processing units included in the mobile capturing device and partly executed in the one or more processing units included in the remote computing device.

6. The system of claim 1, wherein the estimated pose includes a combination of position and orientation of the subject, and wherein the estimated pose further includes z-axis coordinate with respect to the location on the given image of the subject.

7. The system of claim 1, wherein the augmentation of the plurality of the missing single and coupled body parts further includes analyzing a previous location of a particular body part and/or a preset degree of freedom which refers to freedom of movement of a rigid body in a three-dimensional space.

8. The system of claim 1, wherein the basic convolutional features include basic features including points, lines and circles of the subject in the virtual space, or planar patches or composite features, and wherein body parts are selected from nose, neck, right shoulder, right elbow, right wrist, left shoulder, left elbow, left wrist, right hip, right knee, right ankle, left hip, left knee, left ankle, or groin.

9. The system of claim 1, wherein the one or more processing units further implement one or more machine learning algorithms to compile pose information included in the skeletal representation of the subject to form a 2D representation of the skeletal representation.

10. The system of claim 9, wherein the one or more processing units further implement one or more machine learning algorithms to analyze the skeletal representation of the estimated posture by generating complex analytic feature, including joint angles, for metric comparison to indicate a stage of that particular estimated posture of the subject while moving in the virtual space.

11. The system of claim 10, wherein the one or more processing units further implement one or more machine learning algorithms to evaluate the estimated posture of the subject by generating a plurality of best posture hypotheses using N-best inference algorithm and determining a best posture with respect to previous feature correspondences.

12. The system of claim 11, wherein the one or more processing units further implement one or more machine learning algorithms to evaluate the best posture for error analysis by comparing the best posture with a ground truth posture of the subject in the virtual space.

13. The system of claim 11, wherein the one or more processing units further implement one or more machine learning algorithms to transform the 2D representation from two dimensions into three dimension space.

14. A system for estimating pose and posture information of a subject in real time, the system comprising:

a mobile capturing device for continuously capturing, in real time, image and/or video data of the subject situated or moving freely within a virtual space;

one or more processing units for obtaining, in real time, the image and/or video data from the mobile capturing device and executing one or more machine learning algorithms for automated processing of the image and/or video data, in real time, to:

extract and learn basic convolutional features of the subject to identify specific features of the subject based on learned basic convolutional features, where the specific features of the subject are body parts of the subject;

estimate a pose of the subject based on the specific features of the subject, where estimating the pose of the subject includes:

estimating pose information of each body part related to the specific feature of the subject from a given image of the subject, and where the pose information includes a body part type, x-axis and y-axis coordinates of the body part type with respect to location of the subject on the given image;

couple body parts with other body parts based on a predefined abstract body model;

augmenting a plurality of missing body parts of the subject based on the coupled body parts;

constructing a skeletal representation of the subject by connecting pose information of all the body parts including the coupled body parts and the missing body parts;

generate an abstract human body model of the specific features of the subject based on the estimated pose and the skeletal representation of the connected missing parts and the coupled body parts; and estimate a posture of the subject from the specific features included in the abstract human body model, where the estimated posture is constructed based on the skeletal representation, the pose information of all the body parts in the skeletal representation and a real-time scenario of the subject which provides meaning to the posture; and wherein, the video data includes a plurality of frames; and wherein the abstract human body model comprises information of each body part, along with spatial constraints between body parts in each frame and temporal consistency throughout the plurality of the frames.

15. The system of claim 14, wherein the generating of the abstract human body model of the subject further includes steps of: estimating a plurality of body parts of a subject from the video data; coupling each body part with a pre-defined abstract body part; augmenting a plurality of missing single and coupled body parts of the subject based on the coupled body parts; and constructing a skeletal representation of the subject, representing an estimated posture of the subject, by connecting augmented the plurality of missing parts with the coupled body parts.

16. The system of claim 14, wherein the mobile capturing device is a mobile terminal with at least a digital camera and the one or more processing units are included in the mobile capturing device executing the one or more machine learning algorithms for the automated processing of the image and/or video data, and the system further comprises a remote computing device in connection with the mobile capturing device and wherein the remote computing device includes one or more processing units to partly execute the automated processing of the image and/or video data.

17. The system of claim 15, wherein the one or more processing units further implement one or more machine learning algorithms to evaluate the estimated posture of the subject by generating a plurality of best posture hypotheses using N-best inference algorithm and determining a best posture with respect to previous feature correspondences.

18. A method for estimating pose and posture information of a subject in real time, the method comprising:
   continuously capturing, in real time, image and/or video data of the subject situated in a virtual space covering the subject, using a mobile capturing device;
   implementing, in real time, one or more machine learning algorithms on the image and/or video data, by one or more processing units, and executing, in real time, automated processing of the image and/or video data to:
      extract and learn basic convolutional features of the subject to identify specific features of the subject based on learned basic convolutional features;
      estimate a pose of the subject based on the specific features of the subject, where estimating the pose of the subject includes estimating body part information of each body part related to the specific features from a given image of the subject, and where the body part information including information on a body part type, x-axis and y-axis coordinates of the body part type with respect to location of the subject on the given image;
      generate an abstract human body model of the specific features of the subject based on the estimated pose, wherein the abstract human body model includes the body part information of each body part, along with spatial constraints between the body parts in each frame in the video and temporal consistency between the body parts throughout a plurality of frames in the video;
      tracking the body part information of each body part related to the specific feature of the subject alone the abstract human body model simultaneously and accordingly of the movements of the subject within the virtual space throughout the plurality of frames in the video to estimate a meaningful posture of the subject; and
      estimate a posture of the subject from the specific features included in the abstract human body model;
   wherein generating the abstract human body model of the subject further includes:
      coupling each body part with other body part based on a predefined abstract body part;
      augmenting a plurality of missing body parts of the subject based on the coupled body parts; and
      constructing a skeletal representation of the subject by connecting pose information of all the body parts including the coupled body parts and the missing body parts; and
   wherein the estimated posture of the subject is constructed based on the skeletal representation, the pose information of all the body parts in the skeletal representation and a real-time scenario of the subject which provides meaning to the posture
   wherein, the captured video data includes a plurality of frames.

19. The method of claim 18, further comprising
implementing the one or more machine learning algorithms to compile the pose information included in the skeletal representation of the subject to form a 2D representation of the skeletal representation, and
implementing the one or more machine learning algorithms to transform 2D representation from two dimensions into three dimension space.

20. The method of claim 19, further comprising
implementing the one or more machine learning algorithms, by the one or more processing units, to:
   a. evaluate the estimated posture of the subject by generating a plurality of best posture hypotheses using N-best inference algorithm and determining a best posture with respect to previous feature correspondences; and
   b. evaluate the best posture for error analysis by comparing the best posture with a ground truth posture of the subject in the virtual space.

* * * * *